(12) United States Patent
Okabe et al.

(10) Patent No.: US 7,975,429 B2
(45) Date of Patent: Jul. 12, 2011

(54) APPARATUS FOR PRODUCING SEEDLINGS AND METHOD OF PRODUCING SEEDLINGS

(75) Inventors: Katsuyoshi Okabe, Chuo-ku (JP); Kazuo Tsuchiya, Chuo (JP); Akio Nakaminami, Chuo-ku (JP); De Wu, Chuo-ku (JP); Junya Fuse, Chuo-ku (JP)

(73) Assignee: MKV Dream Co., Ltd., Tokyo (JP)

( * ) Notice: Subject to any disclaimer, the term of this patent is extended or adjusted under 35 U.S.C. 154(b) by 1032 days.

(21) Appl. No.: 10/560,051

(22) PCT Filed: Jun. 14, 2004

(86) PCT No.: PCT/JP2004/008649
§ 371 (c)(1),
(2), (4) Date: Dec. 8, 2005

(87) PCT Pub. No.: WO2005/000005
PCT Pub. Date: Jan. 6, 2005

(65) Prior Publication Data
US 2007/0089359 A1    Apr. 26, 2007

(30) Foreign Application Priority Data

Jun. 27, 2003 (JP) .................... 2003-184745

(51) Int. Cl.
*A01G 31/02* (2006.01)
*A01G 9/24* (2006.01)
(52) U.S. Cl. .............................. 47/61; 47/17
(58) Field of Classification Search ............. 47/60, 61, 47/17, 19.2, 19.1
See application file for complete search history.

(56) References Cited

U.S. PATENT DOCUMENTS

| 4,077,158 A | * | 3/1978 | England | 47/59 R |
| 4,291,494 A | * | 9/1981 | Knablein et al. | 47/17 |
| 4,914,858 A | | 4/1990 | Nijssen et al. | |

(Continued)

FOREIGN PATENT DOCUMENTS

AT    356 331    4/1980

(Continued)

OTHER PUBLICATIONS

Supplementary European Search Report issued Dec. 3, 2008 in Application No. EP 04 73 6806.

*Primary Examiner* — Son T. Nguyen
(74) *Attorney, Agent, or Firm* — Wenderoth, Lind & Ponack, L.L.P.

(57) ABSTRACT

An apparatus for producing seedlings, wherein rootstocks and scions are nursed on multi-staged seedling culture shelves installed in a closed-type structure surrounded by light-interceptive walls, and wherein the rootstocks and scions are joined to each other to produce grafted seedlings. The grafted seedlings are placed on shelf boards of the seedling culture shelves and covered with a light-transmitting shield including vent holes, and light is projected onto the grafted seedlings through the light-transmitting shield to weld the seedlings. The relative humidity in the light-transmitting shield immediately after the grafting is raised by the evaporation of moisture from the rootstocks and the scions. When photosynthesis is stimulated, gas exchange between the carbon dioxide gas-containing atmosphere within the closed type structure and the atmosphere within the light-transmitting shield are accomplished to replenish an inner space of the light-transmitting shield with carbon dioxide gas.

5 Claims, 5 Drawing Sheets

U.S. PATENT DOCUMENTS

| | | | |
|---|---|---|---|
| 5,315,834 A * | 5/1994 | Garunts et al. | 62/78 |
| 5,341,595 A * | 8/1994 | Griggs et al. | 47/60 |
| 5,822,920 A * | 10/1998 | Tsay | 47/61 |
| 5,946,853 A * | 9/1999 | Jacobs et al. | 47/60 |
| 5,983,562 A * | 11/1999 | Lai | 47/61 |
| 6,061,957 A * | 5/2000 | Takashima | 47/66.1 |
| 7,278,237 B2 * | 10/2007 | Okabe et al. | 47/60 |
| 2003/0101645 A1 * | 6/2003 | Cole et al. | 47/61 |
| 2007/0144067 A1 * | 6/2007 | Farhadi | 47/39 |

FOREIGN PATENT DOCUMENTS

| | | |
|---|---|---|
| DE | 1 943 673 | 8/1966 |
| DE | 33 25 628 | 1/1985 |
| EP | 0 307 991 | 3/1989 |
| GB | 826 101 | 12/1959 |
| GB | 1349001 | 3/1974 |
| JP | 7-79640 | 3/1995 |
| JP | 9-98665 | 4/1997 |
| JP | 10-295198 | 11/1998 |
| JP | 11-56118 | 3/1999 |
| JP | 2946393 | 7/1999 |
| JP | 2001-346450 | 12/2001 |
| JP | 3324205 | 7/2002 |
| NL | 8105823 | 7/1983 |

* cited by examiner

Hole area rate 0%

Hole area rate 50%

Hole area rate 100%

APPARATUS FOR PRODUCING SEEDLINGS AND METHOD OF PRODUCING SEEDLINGS

BACKGROUND OF THE INVENTION

1. Field of the Invention

The present invention relates to an apparatus for producing seedlings and a method of producing seedlings, which make possible, in producing grafted seedlings of fruit vegetables, to perform a consistent process from the culture of their stocks (rootstocks and scions) to welding after grafting at low cost.

2. Description of the Related Art

For fruit vegetables of the nightshade family (including tomatoes and eggplants), cucurbits (including cucumbers and watermelons) and others, their seedlings produced by grafting a rootstock to a scion of each in order to add the characteristics of the rootstock (including pathological resistance) to the scion are extensively used as seedlings superior in productivity and pathological resistance to seedlings known as non-grafted seedlings which undergo no grafting.

These seedlings produced by grafting rootstocks and scions are called grafted seedlings. In a grafted seedling, the faces of a rootstock and a scion cut, either fully or partially, with a cutting tool are matched with each other and the matched faces are agglutinated while, in some cases, being supported with a clip or a tube. This agglutination, also called rooting, has an effect to connect the vascular bundle tissues of the rootstock and of the scion, and to transfer moisture and nutrients from the rootstock to the scion and the anabolic products of photosynthesis by the scion to the rootstock. Therefore, in attempting to improve the effective yield of grafted seedlings, it is essential to enhance the rooting rate of such grafted seedlings.

In order to facilitate this rooting of grafted seedlings, the conditions of the environment in which the grafted seedlings are placed after grafting are important and, in particular, the phase of environment control during the few days immediately after grafting is called welding. During the welding, the vascular bundles of the rootstocks and the scions should be connected to each other in their respective cut faces so as to establish communication routes for moisture, nutrients and anabolic products between the rootstocks and the scions. In such a high-temperature high-humidity environment of little exposure to sunlight, rooting is accelerated by restricting the evaporation of moisture through the stomata of the rootstocks and scions to thereby prevent the rootstocks and scions from drooping and restraining the drying of the area around the agglutinated faces. The welding of cucumbers, for instance, is often accomplished in an environment of high temperature, around 30° C., relative humidity of nearly 100% and a luminous intensity of 3000 to 5000 luxes when it is performed by a method known as young seedling grafting in which grafting is done immediately after the generation of true leaves of the rootstock.

In order to enhance the rooting rate of grafting by performing appropriate welding immediately after the grafting, conventional welding methods utilizing natural light in a welding facility (welding house or welding tunnel) have been extensively adopted. Namely, extensively applied methods using a welding facility include an artificially regulating method in which a tunnel covered with a covering material, such as a vinyl sheet, or a light-shield material is installed within a greenhouse, grafted seedlings are placed therein, and the air temperature and the relative humidity are adjusted by sprinkling water or opening or closing the tunnel covering material and the luminous environment is controlled with the light-shield material. On the other hand, another method using a welding apparatus is mainly used by seedling culture centers where grafted seedlings are produced year round, and has an advantage that, as the inside of the apparatus is a closed space isolated from the external environment, the environment therein can be automatically controlled as desired irrespective of climatic variations.

As a method of seedling culture using artificial light instead of natural light, there has been proposed a method utilizing a closed-type transplant production system as disclosed in, for instance Japanese Patent Laid-Open No. 2001-346450 (see FIG. 4 therein). This system is provided, in a closed space, with an artificial lighting unit using fluorescent lamps, multi-stage seedling culture shelves, an automatic irrigation unit, an air conditioning unit using an air conditioning for household use, a carbon dioxide gas supply unit and so forth, and environment control by the artificial lighting unit, the air conditioning unit and other devices makes seedling culture unaffected by the external climatic conditions possible.

However, these three methods involve the following disadvantages of their own.

First, the method using a welding facility requires fine artificial adjustment according to climatic variations in the ambience, resulting in a greater labor requirement for management. Moreover, welding under weak lighting tends to make the grafted seedling feeble and, since the seedlings themselves are apt to lack vigor and to catch illness due to slow progress of the photosynthesis, no significant growth after the fix planting can be expected. Furthermore, acclimatization by gradually increasing the luminous intensity is usually required after the welding and, as this acclimatization takes a week or longer, the seedling production process is extended correspondingly.

Next, by the method using a welding apparatus, as in the case of the above-described method using a welding facility, welding under weak lighting tends to make the grafted seedling feeble and, since the seedlings themselves are apt to lack vigor and to catch illness due to slow progress of the photosynthesis, no significant growth after the fix planting can be expected. Further, acclimatization by gradually increasing the luminous intensity is usually required after the welding and, as this acclimatization takes a week or longer, the seedling production process is extended correspondingly. Moreover, since the inner space requires a moisture-proof and waterproof structure (in this specification "water-proofness" is a broad concept covering moisture-proofness and drip-proofness as well) because of the environment control conditions, this not only is more expensive than a welding house but also the humid environment necessitates repairs. Namely, whereas fluorescent lamps are mainly used for the lighting unit, the fluorescent tubes are shielded by waterproof-structured covers, and the sockets of the fluorescent tubes are also totally closed. Also, the installation of a humidifier is indispensable, and mist from an ultrasonic humidifier and other sources is discharged into the inside of the apparatus. Whereas a humidity sensor has to be provided to control this humidifying operation, in a high relative humidity region of 95% or more, the detecting portion of the humidity sensor is usually susceptible to dew condensation, which means that deterioration of the detecting element is apt to progress. Furthermore, it is impossible to use an inexpensive household air conditioner for the temperature control purpose, but a refrigerating machine for business use, which is compatible with a high-humidity environment, is used. In this way, the welding apparatus has to be heavily equipped, requiring a waterproof structure and the like. As a result, it not only is more expensive than a welding house but also the humid environment necessitates repairs.

Finally, as the closed-type transplant production system using artificial light is an apparatus exclusively intended for seedling culture, and is embodied with no consideration for the subsequent welding, a separate welding apparatus has to be installed in addition, inviting an increase in the overall cost of the apparatus for producing seedlings.

BRIEF SUMMARY OF THE INVENTION

In view of the circumstances described above, an object of the present invention is to provide an apparatus for producing seedlings and a method of producing seedlings which are capable of carrying out the process from the seedling culture to welding without requiring an expensive waterproof structure to thereby restrain the initial cost and the running cost, capable of making acclimatization unnecessary to thereby shorten the seedling production process, capable of accelerating the growth of seedlings after their fix planting, and further capable of simplifying the management during welding by automating and saving the labor required in seedling culture and welding.

An apparatus for producing seedlings according to a first aspect of the invention includes a closed-type structure (2) surrounded by light-interceptive thermally insulating walls, multi-staged seedling culture shelves (3) provided with a plurality of shelf boards (3a) capable of mounting grafted seedlings (8) thereon, the seedling culture shelves being disposed within the closed-type structure. Further, the apparatus includes an artificial lighting device (5) capable of projecting light onto the grafted seedlings and a fan (4) capable of generating air stream over each stage of the seedling culture shelves, the artificial lighting device and the fan being installed on each stage of the seedling culture shelves; an air conditioning unit (6) capable of controlling the temperature and the humidity within the closed-type structure, a carbon dioxide gas supply unit (7) capable of supplying carbon dioxide gas into the closed-type structure, and a light-transmitting shield (9) detachably disposed to cover the grafted seedlings mounted on each of the shelf boards of the seedling culture shelves, the light-transmitting shield being provided with a plurality of vent holes (15).

The light-transmitting shield is not limited to what transmits light 100%, but may be what transmits, for instance, 50% (namely translucent) of the light. As a typical example of artificial lighting device, a fluorescent lamp can be used. Further, an automatic irrigation device may be additionally installed as required.

According to the apparatus for producing seedlings having such a configuration, by covering grafted seedlings with the light-transmitting shield after the seedling culture of rootstocks and scions, moisture evaporating from the rootstocks and the scions makes the relative humidity within the light-transmitting shield increase to thereby facilitate the rooting of the rootstock and the scions. Moreover, when the inner space of the light-transmitting shield has to be replenished with carbon dioxide gas which decreases with the progress of photosynthesis by the grafted seedlings, the air stream generated by the fan over each stage of the seedling culture shelves accomplishes gas exchange through the vent holes formed in the light-transmitting shield, enabling carbon dioxide gas within the closed-type structure to be supplied to the light-transmitting shield and to facilitate photosynthesis by the grafted seedlings. This makes it possible, without having to rely on a welding apparatus provided with a waterproof structure, to accomplish both seedling culture and welding in a consistent process by using the same apparatus for producing seedlings, and to thereby substantially reduce the initial cost and the running cost.

An apparatus for producing seedlings according to a second aspect of the invention is similar to the apparatus according to the first aspect, except that the plurality of vent holes (15) of the light-transmitting shield (9) are provided with means of varying the rate of hole area (i.e., amount of the vent hole that is open) thereof.

The above-described apparatus makes it possible to finely and appropriately adjust the relative humidity and the concentration of carbon dioxide gas within the light-transmitting shield according to the phase of welding of the grafted seedlings. Namely, when a high relative humidity is required within the light-transmitting shield in order to facilitate the rooting of the rootstocks and the scions immediately after grafting, the relative humidity within the light-transmitting shield can be kept high by reducing the rate of hole area of the vent holes to near 0%. When the rooting of the rootstocks and the scions has made progress to stimulate photosynthesis by the grafted seedlings and a high concentration of carbon dioxide gas is required within the light-transmitting shield, carbon dioxide gas within the closed-type structure can be introduced into the light-transmitting shield through the vent holes by raising the rate of hole area of the vent holes to near 100%, thereby enabling carbon dioxide gas required for the photosynthesis to be supplied into the light-transmitting shield.

A method of producing seedlings according to a third aspect of the invention includes, when grafted seedlings (8) are to be produced by using the apparatus for producing seedlings, cultivating rootstocks and scions on the seedling culture shelves (3) of the apparatus, joining the cultivated rootstocks and scions with each other to prepare grafted seedlings, mounting the grafted seedlings on the shelf boards (3a) of the seedling culture shelves (3), covering the grafted seedlings on each of the shelf boards with the light-transmitting shield (9) provided with the plurality of vent holes (15), and projecting light of a predetermined luminous intensity onto the grafted seedlings from the artificial lighting device (5) of the apparatus through the light-transmitting shield. Further, the method includes controlling the temperature and the humidity within the closed-type structure (2) of the apparatus by the air conditioning unit (6) of the apparatus and supplying carbon dioxide gas into the closed-type structure by the carbon dioxide gas supply unit (7) while generating air stream over each of the shelf board by the fan (4) to thereby enable gas exchange between the inner space of the closed-type structure and the inner space of the light-transmitting shield to be carried out through the vent holes of the light-transmitting shield, and performing welding of the grafted seedlings under this condition.

The method of the present invention makes it possible to accomplish both cultivation of rootstocks and scions and welding of grafted seedlings in a consistent process by using the same apparatus for producing seedlings and to thereby substantially reduce the initial cost and the running cost. Also, during the welding period, covering of the grafted seedlings with the light-transmitting shield serves to increase the relative humidity within the light-transmitting shield with the moisture evaporating from the rootstocks and the scions and to thereby facilitate the rooting of the rootstock and the scions. Moreover, when the inner space of the light-transmitting shield has to be replenished with carbon dioxide gas which decreases with the progress of photosynthesis by the grafted seedlings, the air stream generated by the fan over each stage of the seedling culture shelves accomplishes gas exchange through the vent holes formed in the light-transmitting shield, enabling carbon dioxide gas within the closed-type structure to be supplied to the light-transmitting shield and to facilitate photosynthesis by the grafted seedlings.

A method of producing seedlings according to a fourth aspect of the invention includes the method according to the third aspect, wherein defined by claim 4 of the present invention is characterized in that, in claim 3, by making controllable the rate of hole area of the plurality of vent holes (15) in the light-transmitting shield (9), the quantity of gas exchange between the inner space of the closed-type structure (2) and the inner space of the light-transmitting shield (9) through the vent holes are made controllable.

The above-described method makes it possible, as in the apparatus for producing seedlings defined by the second aspect of the invention, to finely and appropriately adjust the relative humidity and the concentration of carbon dioxide gas within the light-transmitting shield according to the phase of welding of the grafted seedlings.

Further, a method of producing seedlings according to a fifth aspect of the invention includes the method according to the fourth aspect, wherein the luminous intensity during the welding of the grafted seedlings (8) is set to between 150 and 350 $\mu mol/m^2/s$ in terms of the photosynthesis photon flux density (PPF).

By the above-described method, the luminous intensity during the welding of the grafted seedlings raises to about three times the normal level or above, and so photosynthesis by the grafted seedlings during the welding is further facilitated, the step of acclimatization after the welding becomes unnecessary, and the growth facilitation after the fix planting is accelerated.

Incidentally, parenthesized numerals in the foregoing description of the present invention are only for the sake of convenience in indicating the respectively corresponding elements in the drawings, and therefore the invention is not limited or bound by illustrations in the drawings. The same applies to the description of claims attached hereto.

DETAILED DESCRIPTION OF THE INVENTION

Embodiments of the present invention will be described below with reference to the drawings.

Figure 1:
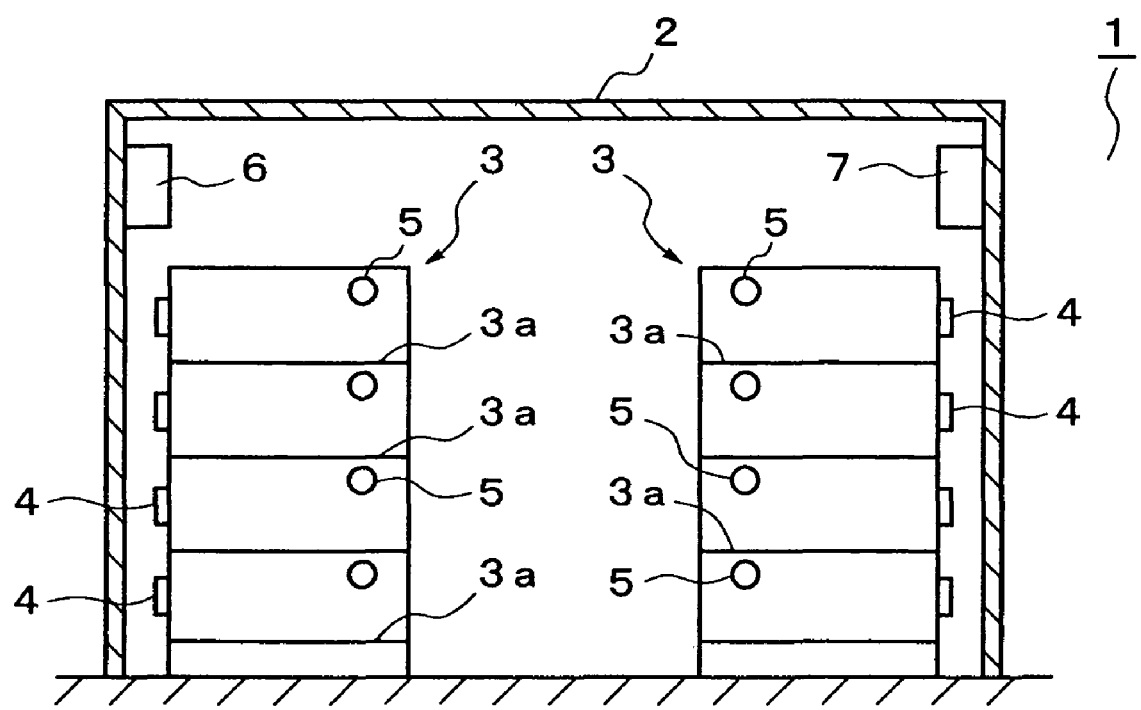
FIG. 1 is a vertical section showing one embodiment of an apparatus for producing seedlings according to the present invention.
Figure 2:
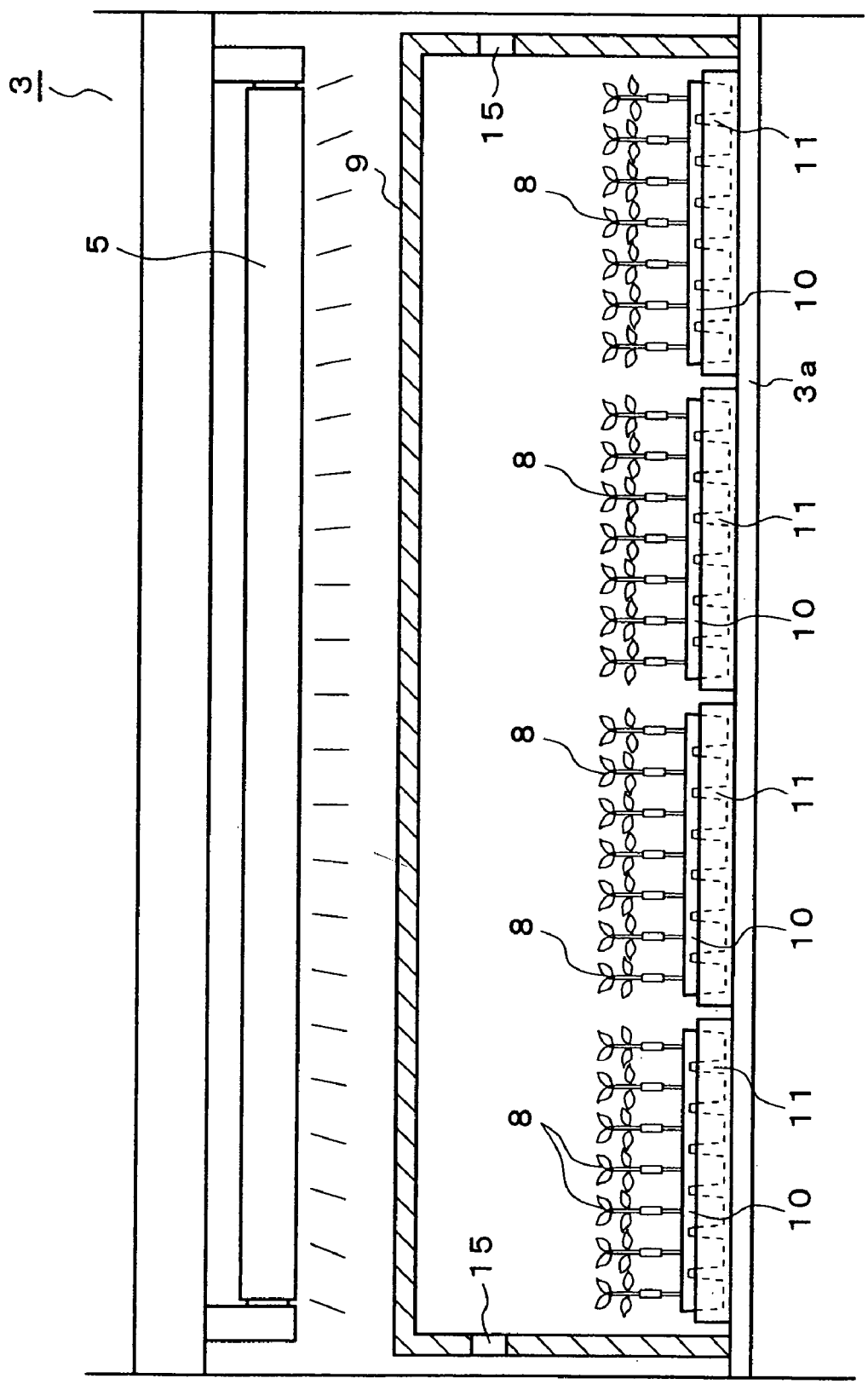
FIG. 2 is an enlarged longitudinal section showing the apparatus for producing seedlings shown in FIG. 1.

As shown in FIG. 1, the apparatus for producing seedlings 1 has a closed-type structure 2 surrounded by light-interceptive thermally insulating walls, and two multi-staged seedling culture shelves 3 are disposed within the closed-type structure 2. Each of the seedling culture shelves 3 is provided with a plurality of (four in FIG. 1) shelf boards 3a, and each shelf board 3a can be mounted with a plurality of grafted seedlings 8 in a form in which they are planted in the plugs of plug trays 10 on lower trays 11. Above each of the shelf boards 3a a fluorescent lamp 5 is fitted as an artificial lighting device as shown in FIG. 1, so that light can be projected from the fluorescent lamp 5 onto the grafted seedlings 8 mounted on the shelf board 3a. Further, each of the shelf boards 3a is detachably provided with a box-shaped light-transmitting shield 9 formed of acrylic plastic or some other synthetic resin as shown in FIG. 2, so that the grafted seedlings 8 mounted on the shelf boards 3a can be covered by the light-transmitting shield 9.

Also, as shown in FIG. 1, an air conditioning unit 6 is installed in the closed-type structure 2, and the temperature and humidity in the closed-type structure 2 can be controlled by this air conditioning unit 6. A carbon dioxide gas supply unit 7 is further provided in the closed-type structure 2, and carbon dioxide gas can be supplied into the closed-type structure 2 by this carbon dioxide gas supply unit 7.

Further, a fan 4 is provided in each stage of the seedling culture shelves 3 to generate an air stream over each stage, so that air in the closed-type structure, whose temperature and humidity are controlled by the air conditioning unit 6 and carbon dioxide gas from the carbon dioxide gas supply unit 7 can circulate over each stage of the seedling culture shelves.

As the apparatus for producing seedlings 1 has the configuration described above, the procedure of producing grafted seedlings 8 of fruit vegetables such as the nightshade family or cucurbits by using this apparatus 1 is as follows.

First, rootstocks and scions are separately cultivated on the seedling culture shelves 3. Since this seedling culture is carried out in the atmosphere whose temperature and humidity in the closed-type structure 2 are controlled under appropriate artificial lighting, the hollow portions found in the hypocotyls under the cotyledons (lower hypocotyls) tend to be smaller than in those grown under natural light, and the hypocotyls to be thick and hard. As a result, stocks (rootstock and scions) with thicker and darker-colored leaves can be obtained.

When the rootstocks and the scions have been cultivated in this way, these rootstocks and scions are taken out of the seedling culture shelves 3, cut and joined with each other to prepare grafted seedlings 8. There is no particular restriction to the method of this grafting; employable methods include splice grafting in which the cut faces of the rootstock and the scion are matched and held with a supporting device, such as a clip, and cut grafting in which the part of the rootstock above the cotyledon is cut off, a notch is cut into the tip thereof and a cut scion is inserted into the notch. At this grafting, the hypocotyls of the stocks (rootstocks and scions) are thick with little hollow portions as described above. This means that the vascular bundles in the hypocotyls are developed in number and individual thickness, and therefore the vascular bundles of the rootstock and the scion are easier to be connected together at the time of agglutination. Further, the condition that the hypocotyls of the stocks (rootstock and scion) are hard means that the rootstock and the scion can be strongly pressed together at the time of agglutination, and contributes to enhancing the rooting rate.

When the grafting seedlings 8 have been completed in this way, these grafted seedlings 8 are planted in the plugs of the plug trays 10 on the lower trays 11 as shown in FIG. 2, and the lower trays are placed on the shelf board 3a of the seedling culture shelf 3 and covered with the light-transmitting shield 9.

Then, light of a predetermined luminous intensity (e.g. 150 to 350 µmol/m$^2$/s in terms of the effective photon flux density of photosynthesis: three times the normal level or higher) is projected from the fluorescent lamp 5 onto the grafted seedlings 8 through the light-transmitting shield 9. At the same time, while an air stream is generated over each stage of the seedling culture shelves 3 by the fan 4 disposed on each of the shelves, the temperature and humidity within the closed-type structure 2 are controlled by the air conditioning unit 6, and carbon dioxide gas is supplied into the closed-type structure 2 by the carbon dioxide gas supply unit 7. In this condition, welding of the grafted seedlings is carried out in the light-transmitting shield 9.

Although a high relative humidity is required to facilitate the rooting of the rootstocks and the scions during the welding of the grafted seedlings and immediately after their grafting, moisture evaporates from the rootstocks and the scions of the grafted seedlings 8 within the light-transmitting shield 9 to raise the relative humidity to a range of 90 to 100% and facilitate the rooting of the rootstocks and the scions.

On the other hand, as photosynthesis by the grafted seedlings is activated while the rooting of the rootstocks and the scions is being facilitated at higher luminous intensity than normal, the concentration of carbon dioxide gas within the light-transmitting shield 9 falls, constituting a factor to reduce the velocity of the photosynthesis. Namely, since carbon dioxide gas decreases and oxygen increases when photosynthesis by the grafted seedlings 8 is activated, the concentration of carbon dioxide gas within the light-transmitting shield 9 becomes lower than that outside the light-transmitting shield 9. For instance, when the concentration of carbon dioxide gas outside the light-transmitting shield 9 is 1000 ppm, the concentration of carbon dioxide gas inside the light-transmitting shield 9 is 400 ppm.

Figure 3:
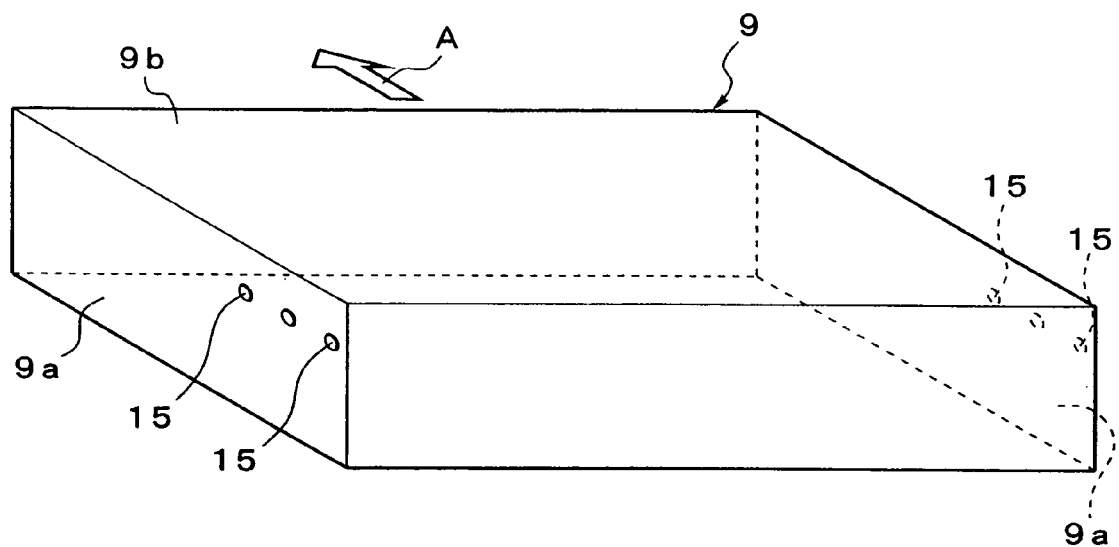
FIG. 3 is a perspective view showing an embodiment of light-transmitting shield having vent holes for use in the present invention.

For this reason, according to the present invention, a plurality of vent holes 15 not large enough to adversely affect the humidified condition within the light-transmitting shield 9 are provided in the wall faces of the light-transmitting shield 9 as shown in FIG. 2 and FIG. 3. For example, as illustrated in FIG. 3, according to one aspect of the invention the vent holes 15 are only located in the two side faces 9a of the light-transmitting shield 9. As a result, the air stream (arrow A in FIG. 3) generated over each stage of the seedling culture shelf by the fan causes gas exchange to be accomplished through the vent holes 15 provided in the light-transmitting shield 9. By this gas exchange, the carbon dioxide gas-containing atmosphere within the closed-type structure 2 can be supplied into the light-transmitting shield 9 and carbon dioxide gas which decreases with the photosynthesis by the grafted seedlings can be replenished to thereby facilitate the photosynthesis by the grafted seedlings.

Incidentally, the positions where the plurality of vent holes 15 are formed in the light-transmitting shield 9 is preferably in side faces 9a of the light-transmitting shield 9, which are parallel to the direction of the air stream (arrow A) generated by the fans as shown in FIG. 3. By forming the vent holes 15 in the side faces 9a of the light-transmitting shield, a static pressure is generated by the air stream flowing in parallel to the side faces 9a, and this static pressure enables a gas exchange to be effectively accomplished between the inner space of the closed-type structure 2 and that of the light-transmitting shield 9, even if the vent holes 15 are relatively small. As the top face 9b of the light-transmitting shield 9 also constitutes a plane parallel to the flow of the air stream generated by the fans, forming vent holes 15 (not shown) in this top face 9b would also give a gas exchange effect due to the static pressure of the air stream similar to the above-described case.

Figure 4:
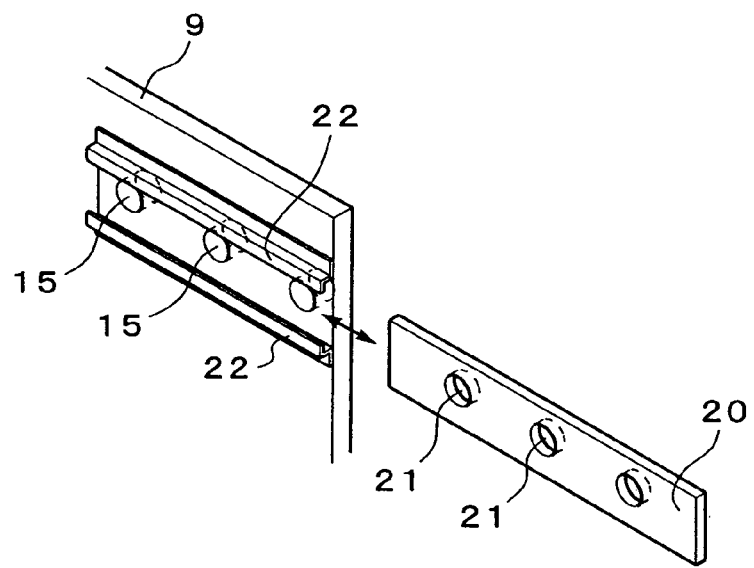
FIG. 4 is a perspective view showing an embodiment of hole area adjusting plate for varying the rate of hole area of the vent holes in the light-transmitting shield.
Figure 5:
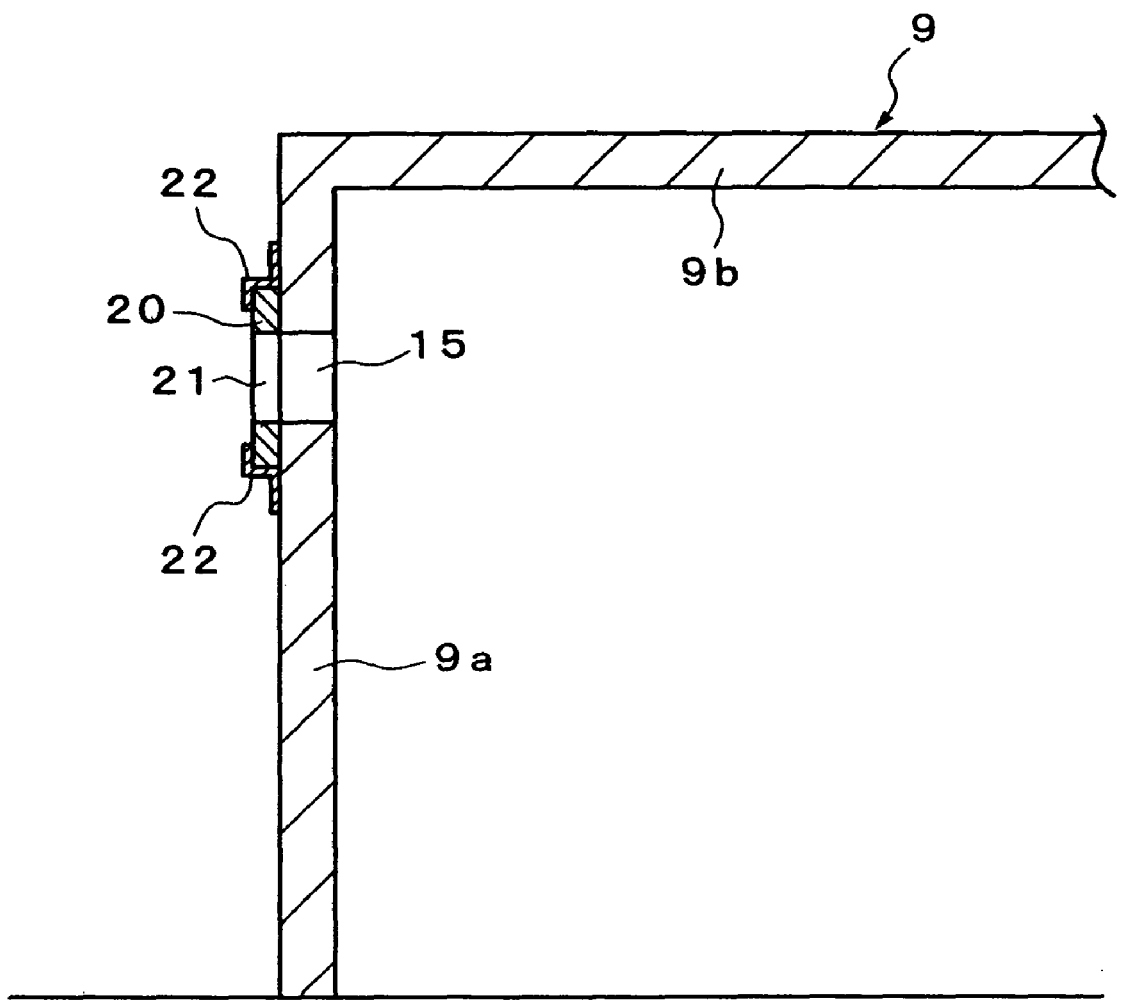
FIG. 5 is a section showing an embodiment for slidably holding the hole area adjusting plate onto the light-transmitting shield.

It is preferable that the plurality of vent holes 15 formed in the light-transmitting shield 9 are provided with means of arbitrarily varying their rate of hole area within a range from 0% (fully closed) to 100% (fully open) as desired. As the means of varying the rate of hole area, though subject to no particular limitation, a hole area adjusting plate 20 shown in FIG. 4 and FIG. 5 can be used for instance. This hole area adjusting plate 20 is provided with a plurality of openings 21 respectively corresponding to the plurality of vent holes 15 formed in the light-transmitting shield 9 and is slidably held (see the directions of the arrow in FIG. 4) by a pair of guide frames 22 fixed on the outer face of the light-transmitting shield 9 in which the vent holes 15 are formed.

Figure 6A:
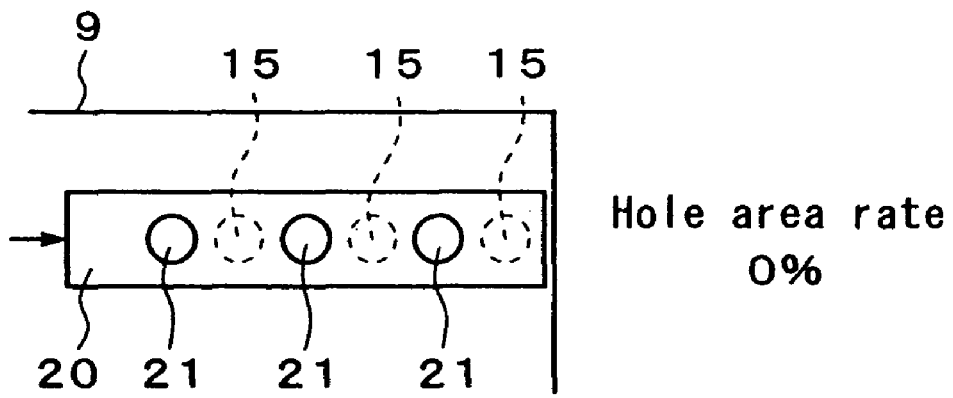
FIG. 6A is a diagram illustrating a state in which the rate of hole area of the vent holes in the light-transmitting shield is adjusted to 0% with the hole area adjusting plate.
Figure 6B:
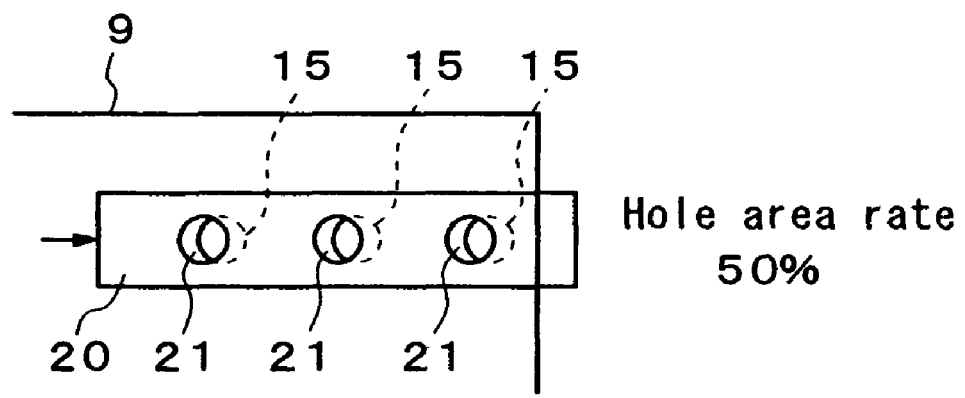
FIG. 6B is a diagram illustrating a state in which the rate of hole area of the vent holes in the light-transmitting shield is adjusted to 50% with the hole area adjusting plate.
Figure 6C:
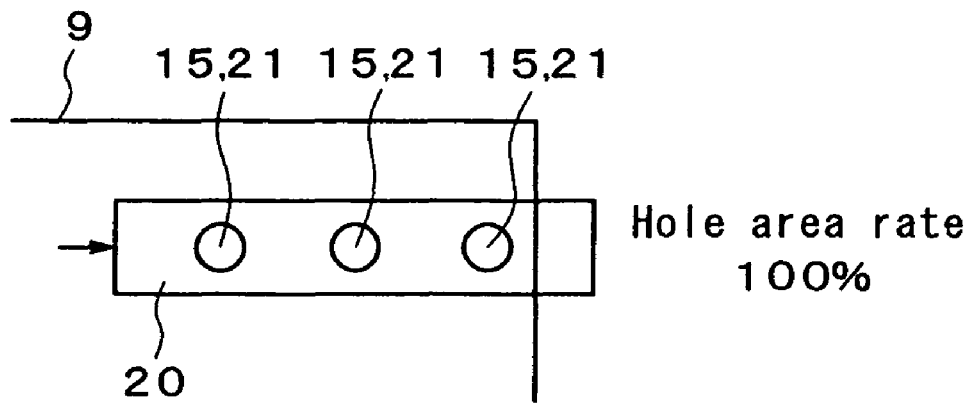
FIG. 6C is a diagram illustrating a state in which the rate of hole area of the vent holes in the light-transmitting shield is adjusted to 100% with the hole area adjusting plate.

The operation of this hole area adjusting plate 20 will be described below with reference to FIG. 6A through FIG. 6C. In order to facilitate the rooting of the rootstocks and the scions immediately after the grafting, the hole area adjusting plate 20 is slid to a position where the vent holes 15 in the light-transmitting shield 9 and the openings 21 in the hole area adjusting plate 20 do not overlap each other as shown in FIG. 6A. Thus, the hole area rate of the vent holes 15 is reduced to 0% (vent holes fully closed) or in its vicinity to keep the inner space of the light-transmitting shield 9 in a closed or nearly closed state during the welding period in which a high relative humidity of 80 to 100% is required within the light-transmitting shield 9.

When the photosynthesis by the grafted seedlings is activated by facilitating the rooting of the rootstocks and the scions, the concentration of carbon dioxide gas within the light-transmitting shield 9 becomes insufficient. Therefore, by gradually sliding the hole area adjusting plate 20 to a state in which, for instance, half of each vent hole 15 and half of each opening 21 overlap each other (hole area rate 50%) as shown in FIG. 6B or the whole of each vent hole 15 and the whole of each opening 21 overlap each other (hole area rate 100%) as shown in FIG. 6C, the quantity of gas exchange between the inner space of the closed-type structure 2 and that of the light-transmitting shield 9 can be increased to thereby gradually increase the concentration of carbon dioxide gas within the light-transmitting shield 9. Also in this case, the static pressure due to the flow of air stream (arrow A in FIG. 3) generated by the fans causes gas exchange between the carbon dioxide gas-containing atmosphere within the closed-type structure 2 and the inner space of the light-transmitting shield 9 through the vent holes 15 to be effectively accomplished. The facilitation of gas exchange through the vent holes 15 produces air stream also within the light-transmitting shield 9 to stir the internal atmosphere therein. As a result, the temperature distribution, the humidity distribution and the distribution of the concentrations of carbon dioxide gas within the light-transmitting shield 9 are evened to equalize the rooting and growth of the grafted seedlings.

Incidentally, while increase of the hole area rate of the vent holes 15 in the light-transmitting shield 9 by sliding the hole area adjusting plate 20 causes the concentration of carbon dioxide gas within the light-transmitting shield 9 to be raised by gas exchange through the vent holes 15, the relative humidity drops on the other hand. However, the need to keep a high relative humidity gradually decreases with the progress of rooting of the rootstocks and the scions of the grafted seedlings, and the need to raise the concentration of carbon dioxide gas gradually increase not to let the velocity of photosynthesis slow down. Therefore, the relative humidity drop within the light-transmitting shield 9 due to the increase of the hole area rate of the vent holes 15 and the rise of the concentration of carbon dioxide gas in the welding process of the grafted seedlings are not inconsistent with each other. By providing the hole area adjusting plate 20, it becomes possible to finely and appropriately adjust the hole area rate of the vent holes 15 between 0 and 100% according to the condition of rooting or growth of the grafted seedlings.

As the means of varying the hole area rate of the plurality of vent holes 15 in the light-transmitting shield, various other means than the hole area adjusting plate 20 described above can be adopted as well. For instance, a structure in which ten vent holes 15 are formed in the light-transmitting shield and each of the vent hole 15 is provided with a detachable seal to individually block its hole area may be adopted. In this structure, if all the ten vent holes are blocked, the hole area rate will be 0%. Further, by peeling off the seals one by one, the hole area rate will be raised by 10% at a time, such that if all the seals are peeled off, the hole area rate will become 100%. In this way, the overall hole area rate of the plurality of vent holes 15 can be varied as desired between 0 and 100%.

In the above-described embodiment for carrying out the present invention, since the luminous intensity during the welding of the grafted seedlings 8 is raised to about three times the normal level or above, photosynthesis by the grafted seedlings 8 during the welding is further facilitated and the growth facilitation after the welding is accelerated. Namely, as described above, since the culture of the stocks (rootstocks and scions) is carried out in the atmosphere within the closed-type structure 2 whose temperature and humidity are controlled under appropriate artificial lighting, the vigor of the rootstocks and the scions are strong, and the rooting of the grafted seedlings obtained from such rootstocks and scions are rapid. As a result, exposure to strong light even during the welding of the grafted seedlings 8 does not invite drooping or obstruct their rooting, rather serving as a factor to facilitate growth instead.

When the welding of the grafted seedlings 8 is completed in this way, these grafted seedlings 8 are taken out of the apparatus for producing seedlings 1 and used for fix planting in the farm. Since the grafted seedlings 8 are exposed to a high luminous intensity (e.g. 150 to 350 $\mu mol/m^2/s$) during the welding, their photosynthesis during the welding is facilitated, and accordingly the acclimatization step itself may be omitted. This is because the facilitation of the photosynthesis gives strong vigor to the grafted seedlings 8, and thus they are enabled to stand even they are exposed to the strong light in the farm.

Incidentally, though the description of the foregoing embodiment for carrying out the present invention referred to a case in which a box-shaped light-transmitting shield 9 formed of synthetic resin was used, neither the material nor the shape of the light-transmitting shield 9 is not limited to these, but a sheet-shaped light-transmitting shield 9 formed of unwoven cloth can as well be used for instance.

Also, the description of the foregoing embodiment referred to a case in which the rooting of the rootstocks and the scions was facilitated by enclosing the moisture evaporating from the rootstocks and the scions of the grafted seedlings 8 within the light-transmitting shield 9 and thereby increasing the relative humidity, a humidifier (not shown) may be additionally disposed for auxiliary humidifying for the purpose of further facilitating the rooting. In this case, the humidifying effect is enhanced by adjusting the hole area rate of the vent holes 15 provided in the light-transmitting shield 9 to 0% or its vicinity.

Further, though the description of the foregoing embodiment referred to a case in which the fluorescent lamp 5 was used as the artificial lighting device, some other artificial lighting device than the fluorescent lamp 5 (for instance a light emitting diode) can as well be substituted.

Examples of the present invention will be described below.

Example 1

Grafted seedlings were produced by grafting tomato scions (name of variety: House Momotaro) to tomato rootstocks (name of variety: Anchor T) using the method of producing seedlings according to the present invention. The conditions of cultivating the stocks were, for both tomato rootstocks and tomato scions, 16 hours/day in photoperiod duration, 25° C. in photoperiod temperature, 25° C. in darkperiod temperature, 270 $\mu mol/m^2/s$ in luminous intensity in terms of the photosynthesis photon flux density, and 1000 ppm in concentration of carbon dioxide gas.

The conditions of welding the grafted seedlings after grafting were 16 hours/day in photoperiod duration, 25° C. in photoperiod temperature, 25° C. in darkperiod temperature, and 270 $\mu mol/m^2/s$ in luminous intensity in terms of the photosynthesis photon flux density. Incidentally, although the hole area rate of the vent holes in the light-transmitting shield was so adjusted to make the relative humidity and the concentration of carbon dioxide gas within the light-transmitting shield 95% and 200 ppm, respectively, in the light period immediately after grafting and 85% and 800 ppm, respectively, two days after the welding, the average concentration of carbon dioxide gas in the light period over the whole welding duration was 750 ppm.

As a result, since the number of days required for the culture of stocks was 12 days for both tomato rootstocks and tomato scions, and the number of days required for the welding after the grafting was six days, the total duration of the producing process was 18 days. This revealed that the total duration was considerably shortened as compared with the conventional case of using natural light (about 25 to 38 days).

Example 2

Grafted seedlings were produced by grafting cucumber scions (name of variety: Encore 10) to cucumber rootstocks (name of variety: Hikari Power Gold) using the method of producing seedlings according to the present invention. The conditions of cultivating the stocks were, for both cucumber rootstocks and cucumber scions, 16 hours/day in photoperiod duration, 25° C. in photoperiod temperature, 25° C. in darkperiod temperature, 270 $\mu mol/m^2/s$ in luminous intensity in terms of the photosynthesis photon flux density, and 1000 ppm in concentration of carbon dioxide gas.

The conditions of welding the grafted seedlings after grafting were 16 hours/day in photoperiod duration, 25° C. in photoperiod temperature, 25° C. in darkperiod temperature, and 180 to 200 $\mu mol/m^2/s$ in luminous intensity in terms of the photosynthesis photon flux density. Incidentally, although the hole area rate of the vent holes in the light-transmitting shield was so adjusted to make the relative humidity and the concentration of carbon dioxide gas within the light-transmitting shield 95% and 200 ppm, respectively, in the light period immediately after grafting and 88% and 650 ppm, respectively, three days after the welding, the average concentration of carbon dioxide gas in the light period over the whole welding duration was 700 ppm.

As a result, since the number of days required for the culture of stocks was seven days for both cucumber rootstocks and cucumber scions, and the number of days required for the welding after the grafting was six days, the total duration of the producing process was 13 days. This revealed that the total duration was considerably shortened as compared with the conventional case of using natural light (about 22 to 30 days).

According to the present invention, since it enables the process from the culture of rootstocks and scions to welding of grafted seedlings after the grafting to be accomplished in a consistent process by using the same apparatus for producing seedlings, there is no need for a separate welding apparatus equipped with a waterproof structure and the initial cost and the running cost can be reduced.

In welding the grafted seedlings, by covering the grafted seedlings with a light-transmitting shield provided with a plurality of vent holes, the relative humidity in the light-transmitting shield immediately after the grafting is raised by moisture evaporating from the rootstocks and the scions, and the rooting of the rootstocks and the scions is thereby facilitated. When the facilitation of rooting stimulates photosynthesis and invites a shortage of carbon dioxide gas in the light-transmitting shield, the air stream generated over each stage of the seedling culture shelf by the fan causes gas exchange to be accomplished through the vent holes in the light-transmitting shield, and enables the carbon dioxide gas within the closed-type structure to be supplied into the light-transmitting shield to thereby replenish the inner space of the light-transmitting shield with carbon dioxide gas.

Further, by providing means of varying the hole area rate of the vent holes in the light-transmitting shield, it becomes possible to finely and appropriately adjust the relative humidity and the concentration of carbon dioxide gas within the light-transmitting shield according to the phase of welding of the grafted seedlings.

Moreover, by exposing the grafted seedlings to a luminous intensity higher than a conventional intensity during the welding of grafted seedlings, photosynthesis during the welding is facilitated. As a result, the acclimatization step is unnecessary, and it becomes possible to shorten the producing process of seedlings and to facilitate the growth of the seedlings after their fix planting.

Although the foregoing description referred to a case in which an apparatus according to the present invention is used for a method of producing seedlings for the culture of stocks used for grafting and the welding and acclimatization of grafted seedlings, it can as well be used as a welding apparatus exclusively for the welding and acclimatization of grafted seedlings.

The invention claimed is:

1. An apparatus for producing seedlings without requiring a waterproof structure from seedling culture to welding, so as to make acclimatization unnecessary and accelerate a growth of the seedlings, the apparatus comprising:
   a closed-type structure surrounded by light-interceptive thermally insulating walls;
   multi-staged seedling culture shelves provided with a plurality of shelf boards capable of mounting grafted seedlings thereon, said seedling culture shelves being disposed within said closed-type structure;
   a plurality of artificial lighting devices capable of projecting light onto the grafted seedlings and a plurality of fans capable of generating an air stream over each of said seedling culture shelves, a respective artificial lighting device of said plurality of artificial lighting devices and a respective fan of said plurality of fans being installed on each of said seedling culture shelves;
   an air conditioning unit capable of controlling a temperature and a humidity within said closed-type structure;
   a carbon dioxide gas supply unit capable of supplying carbon dioxide gas into said closed-type structure; and
   a light-transmitting shield detachably disposed to cover the grafted seedlings mounted on each of said plurality shelf boards of said seedling culture shelves,
   wherein said light-transmitting shield includes a plurality of vent holes,
   wherein each of said plurality of vent holes includes a means for varying an open area of the vent hole thereof,
   wherein said light-transmitting shield includes two side faces that are parallel to a direction of a flow of the air stream,
   wherein said two side faces are opposing and non-adjacent side faces of said light-transmitting shield, and
   wherein said plurality of vent holes are formed only in said two side faces of said light-transmitting shield to generate a static pressure from the flow of the air stream, such that said plurality of vent holes are formed only in the opposing and non-adjacent side faces of said light-transmitting shield, and such that the static pressure provides a gas exchange between an inner space of the closed-type structure and an inner space of said light-transmitting shield, so as to make the acclimatization unnecessary during the welding of the seedlings.

2. The apparatus according to claim 1, wherein the apparatus includes a plurality of said light-transmitting shields, each of said plurality of said light-transmitting shields being mounted on a respective shelf board of said plurality of shelf boards.

3. The apparatus according to claim 1,
   wherein said light-transmitting shield includes five sides,
   wherein said five sides of said light-transmitting shield includes (i) a top side, (ii) said two side faces that are opposing and non-adjacent side faces having the plurality of vent holes formed therein, and (iii) two additional opposing and non-adjacent sides,
   wherein, when said light-transmitting shield is disposed to cover the grafted seedlings, said top side is located above the grafted seedlings,
   wherein, when said light-transmitting shield is disposed to cover the grafted seedlings, said two side faces are located at sides of the grafted seedlings, and
   wherein, when said light-transmitting shield is disposed to cover the grafted seedlings, said two additional opposing and non-adjacent sides are located at sides of the grafted seedlings, and
   wherein none of said two side faces of said light-transmitting shield having the plurality of vent holes formed therein are located at said top side of said light-transmitting shield.

4. The apparatus according to claim 3,
   wherein the direction of the flow of the air stream is such that (i) the air stream flows along said two side faces of said light-transmitting shield, and (ii) the air stream flows perpendicular to said two additional opposing an non-adjacent sides.

5. The apparatus according to claim 1, wherein each means for varying the open area of each of said plurality of vent holes includes:
   guide frames fixed on an outer face of said light transmitting shield in a longitudinal direction; and
   a hole area adjusting plate slidably held by said guide frames and including a plurality of openings varying a size of the open area to adjust a hole area rate between 0% and 100% by slidably moving said hole area adjusting plate along said guide frames in the longitudinal direction.

* * * * *